United States Patent
Xu et al.

(10) Patent No.: US 10,018,862 B2
(45) Date of Patent: Jul. 10, 2018

(54) FRAME COMPONENT AND DISPLAY DEVICE

(71) Applicant: Boe Technology Group Co., Ltd., Beijing (CN)

(72) Inventors: Jian Xu, Beijing (CN); Jianbo Xian, Beijing (CN); Yong Qiao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 26 days.

(21) Appl. No.: 15/105,787

(22) PCT Filed: Sep. 22, 2015

(86) PCT No.: PCT/CN2015/090261
§ 371 (c)(1),
(2) Date: Jun. 17, 2016

(87) PCT Pub. No.: WO2016/201816
PCT Pub. Date: Dec. 22, 2016

(65) Prior Publication Data
US 2017/0205657 A1     Jul. 20, 2017

(30) Foreign Application Priority Data
Jun. 15, 2015 (CN) .................. 2015 2 0411078 U

(51) Int. Cl.
*H05K 7/00* (2006.01)
*H05K 5/00* (2006.01)
*G02F 1/1333* (2006.01)

(52) U.S. Cl.
CPC .... *G02F 1/133308* (2013.01); *G02F 2201/46* (2013.01)

(58) Field of Classification Search
CPC ........................................................ G02F 1/13
(Continued)

(56) References Cited

U.S. PATENT DOCUMENTS 6,498,718 B1 * 12/2002 Kim .................. G02F 1/133308
349/58

FOREIGN PATENT DOCUMENTS

CN         101051152        10/2007
CN         101464572        6/2008
(Continued)

OTHER PUBLICATIONS

International Search Report and Written Opinion from PCT/CN2015/090261 dated Mar. 31, 2016.

*Primary Examiner* — Jerry Wu
(74) *Attorney, Agent, or Firm* — Calfee, Halter & Griswold LLP

(57) ABSTRACT

The present disclosure provides a frame component and a display device. The frame component comprises a glue frame and a backboard. The glue frame comprises a glue frame sidewall which encloses as a frame-type structure. The backboard comprises a backboard sidewall and a backboard bottom wall. The backboard sidewall surrounds the external side of the glue frame sidewall. The glue frame sidewall is provided with a fixing structure for connecting the glue frame to the backboard in a fixed manner, and the fixing structure forms a defining structure at the lower surface of the backboard bottom wall. The defining structure is used for defining the position of the printed circuit board. The present disclosure can simplify the structures of the frame component and the display device.

13 Claims, 3 Drawing Sheets

(58) Field of Classification Search
USPC .................................................. 361/679.01
See application file for complete search history.

(56) References Cited

FOREIGN PATENT DOCUMENTS

| CN | 101465472 | 6/2009 |
| JP | 2008235136 | 10/2008 |
| JP | 2010230962 | 10/2010 |
| JP | 2014115313 | 6/2014 |

\* cited by examiner

FRAME COMPONENT AND DISPLAY DEVICE

RELATED APPLICATIONS

The present application is the U.S. national phase entry of PCT/CN2015/090261, with an international filing date of Sep. 22, 2015, which claims the benefit of Chinese Patent Application No. 201520411078.2, filed on Jun. 15, 2015, the entire disclosures of which are incorporated herein by reference.

FIELD

The present disclosure relates to the field of display technologies, and specifically to a frame component and a display device comprising the frame component.

BACKGROUND

A liquid crystal display device comprises a display panel and a backlight module, wherein the backlight module comprises a backboard, a glue frame arranged at inner sides of the backboard in a fixed manner and an optical film arranged within the glue frame. The display panel is provided with a drive circuit connected to a flexible printed circuit board (FPCB), and the flexible printed circuit board is bent to the backside of the backboard to be connected to a printed circuit board (PCB) provided with electronic elements.

In the prior art, the backboard is usually provided with grooves at its sides, and the glue frame is correspondingly provided with protrusions, thereby fixing the glue frame to the backboard by means of engagement. At that time, in order to prevent positional movement of the printed circuit board, there is a need to arrange a positioning structure individually, for example, manufacturing positioning protrusions, mounting detachable positioning pieces, etc. on the backboard. The above solutions cause the structure and the manufacturing process of the display device to be more complicated.

SUMMARY

An object of the present disclosure is to provide a frame component and a display device comprising the frame component, thereby optimizing the structure for fixing a printed circuit board and simplifying the manufacturing process.

To reach the above purpose, the present disclosure provides a frame component comprising a glue frame and a backboard, wherein the glue frame may comprise a glue frame sidewall which encloses as a frame-type structure. The backboard may comprise a backboard sidewall and a backboard bottom wall, and the backboard sidewall surrounds the external side of the glue frame sidewall. The glue frame sidewall is provided with a fixing structure for connecting the glue frame to the backboard in a fixed manner, and the fixing structure forms a defining structure at a lower surface of the backboard bottom wall for defining the position of a printed circuit board.

In accordance with an embodiment, the fixing structure may comprise a first fixing portion and a second fixing portion. The glue frame is fixed onto the backboard via the first fixing portion and the second fixing portion.

Alternatively, the backboard may be provided with a first engagement hole corresponding to the first fixing portion and a second engagement hole corresponding to the second fixing portion. The first fixing portion is engaged in the first engagement hole, and the second fixing portion is engaged in the second engagement hole.

Alternatively, an end of the first fixing portion may penetrate the first engagement hole and protrude from the lower surface of the backboard bottom wall. An end of the second fixing portion may penetrate the second engagement hole and protrude from the lower surface of the backboard bottom wall.

Alternatively, the part of the first fixing portion which protrudes from the lower surface of the backboard bottom wall and the part of the second fixing portion which protrudes from the lower surface of the backboard bottom wall may form the defining structure.

In accordance with another embodiment, the first fixing portion may comprise a plurality of first fixing pieces, the first engagement hole may comprise a plurality of first through holes in one-to-one correspondence with the first fixing pieces. The first fixing pieces are engaged in corresponding first through holes, and bottom ends of the first fixing pieces protrude from the lower surface of the backboard bottom wall.

Alternatively, the second fixing portion may comprise a plurality of second fixing pieces. The second engagement hole may comprise a plurality of second through holes in one-to-one correspondence with the second fixing pieces, and the second fixing pieces are engaged in corresponding second through holes, and bottom ends of the second fixing pieces protrude from the lower surface of the backboard bottom wall.

In accordance with a further embodiment, the first fixing piece may be a buckle protruding from the glue frame sidewall, the first through hole is arranged at the border between the backboard sidewall and the backboard bottom wall, and the buckle is engaged with the first through hole.

In accordance with yet another embodiment, the second fixing piece may comprise an erect portion and a bent portion, the erect portion is connected between the glue frame sidewall and the bent portion, the erect portion is located within the second through hole, and the upper surface of the bent portion is attached to the lower surface of the backboard bottom wall.

In accordance with an additional embodiment, the glue frame sidewall may comprise an inner sidewall, an outer sidewall and a connecting wall connected between the inner sidewall and the outer sidewall.

Alternatively, the first fixing piece may be arranged at the outer sidewall, and the second fixing piece may be arranged at the inner sidewall.

In accordance with an embodiment, the glue frame may further comprise a support platform connected to the glue frame sidewall, and the support platform rests on a top end of the backboard sidewall to support a display panel.

In accordance with another embodiment, a side of the support platform away from the center of the frame-type structure may be provided with a retaining wall, and the region enclosed by the retaining wall is used for defining the position of the display panel.

In accordance with a further embodiment, the first fixing portion may be arranged at a predetermined distance from the second fixing portion, for example, the predetermined distance may be the width of the printed circuit board.

Correspondingly, the present disclosure further provides a display device which may comprise a display panel and the above frame component provided by the present disclosure, and the display panel is supported on the glue frame.

In the present disclosure, the fixing structure on the glue frame can connect the glue frame to the backboard in a fixed manner, and the fixing structure forms a defining structure at the lower surface of the backboard bottom wall for defining the position of the printed circuit board. Therefore, the glue frame itself can play the role of positioning the printed circuit board while being connected to the backboard, and consequently there is no need to arrange a fixing member individually for positioning the printed circuit board, thereby optimizing the structures of the frame component and the display device and simplifying the manufacturing process.

BRIEF DESCRIPTION OF THE DRAWINGS

The drawings are used to provide further understanding of the present disclosure and constitute a part of the description, which are used for illustrating the present disclosure in company with specific embodiments below but do not limit the present disclosure. In the drawings.

DETAILED DESCRIPTION

Figure 1:
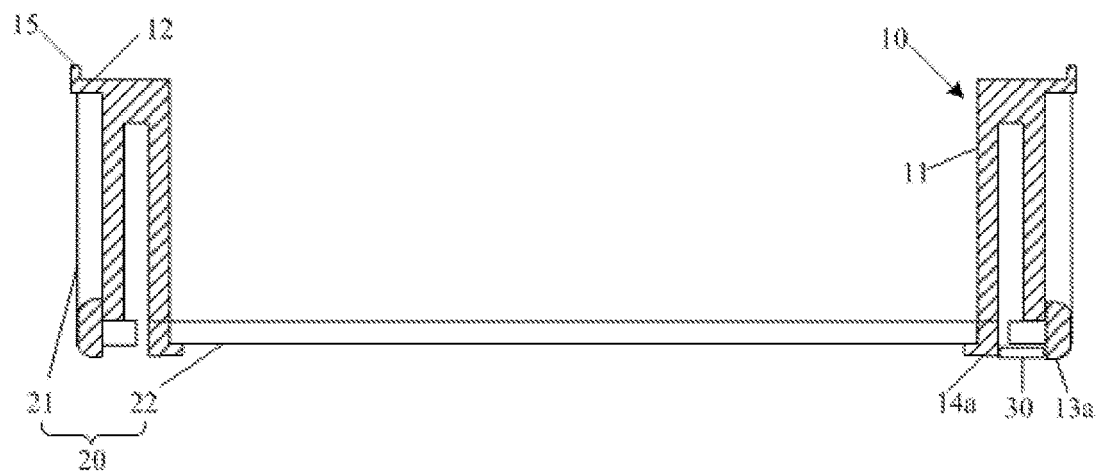
FIG. 1 is a structural schematic diagram of a frame component according to embodiments of the present disclosure.

In the drawings, the reference signs are: 10 glue frame; 11 glue frame sidewall; 111 inner sidewall; 112 outer sidewall; 113 connecting wall; 12 support platform; 13 first fixing portion; 13a first fixing piece; 14 second fixing portion; 14a second fixing piece; 141a erect portion; 142a bent portion; 15 retaining wall; 20 backboard; 21 backboard sidewall; 22 backboard bottom wall; 23 first engagement hole; 23a first through hole; 24 second engagement hole; 24a second through hole; 30 printed circuit board; 40 flexible circuit board.

Specific implementations of the present disclosure are set forth below in detail with reference to the drawings. It should be understood that the specific implementations described herein are only used for illustration and explanation of the present disclosure rather than limitation of the present disclosure.

An aspect of the present disclosure provides a frame component comprising, as shown in FIG. 1, a glue frame 10 and a backboard 20. The glue frame 10 comprises a glue frame sidewall 11 which encloses as a frame-type structure. The backboard 20 comprises a backboard sidewall 21 and a backboard bottom wall 22. The backboard sidewall 21 surrounds the external side of the glue frame sidewall 11. The glue frame sidewall 11 is provided with a fixing structure for connecting the glue frame 10 to the backboard 20 in a fixed manner, and the fixing structure forms a defining structure at the lower surface of the backboard bottom wall 22 for defining the position of a printed circuit board 30.

The term "the external side of the glue frame sidewall 11" as used herein refers to the side of the glue frame sidewall 11 which is away from the middle part of the frame-type structure, and the terms "upper" and "lower" used in the present disclosure refer to the upper part and the lower part in FIG. 1, respectively.

In the present disclosure, the fixing structure can connect the glue frame 10 to the backboard 20 in a fixed manner, and the fixing structure forms a defining structure at the lower surface of the backboard bottom wall 22. The defining structure is used for defining the position of the printed circuit board 30 and plays the role of positioning the printed circuit board 30. Consequently, there is no need to arrange a fixing member individually for positioning the printed circuit board 30, thereby optimizing the structure of the frame component and simplifying the manufacturing process.

Figure 3:
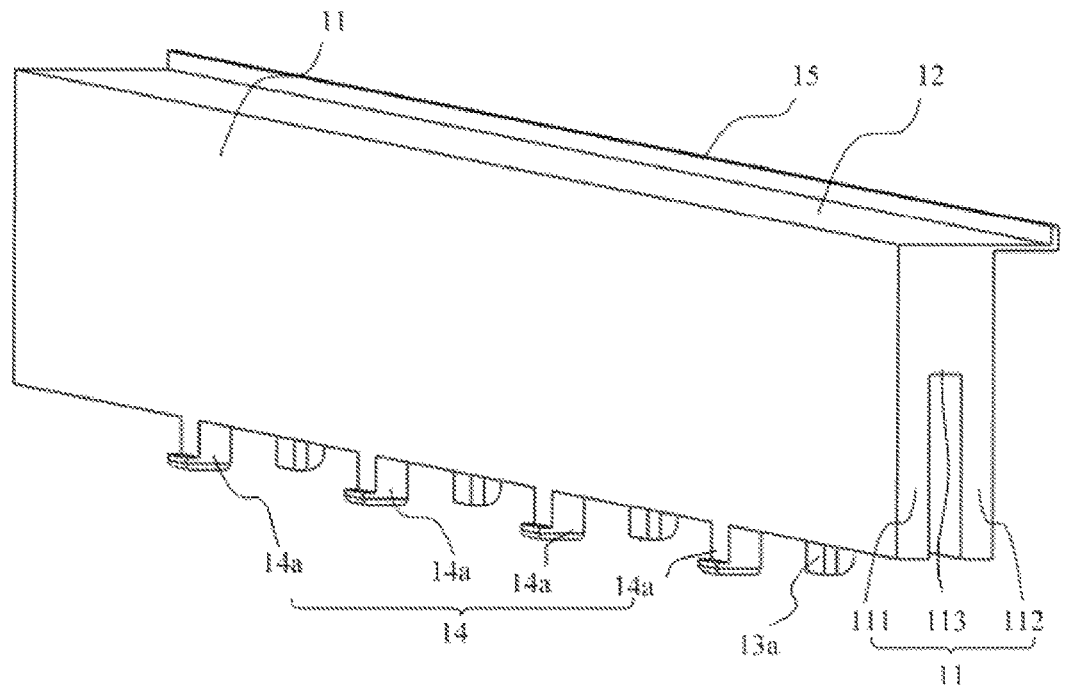
FIG. 3 is a structural schematic diagram of a glue frame according to an embodiment of the present disclosure.
Figure 4:
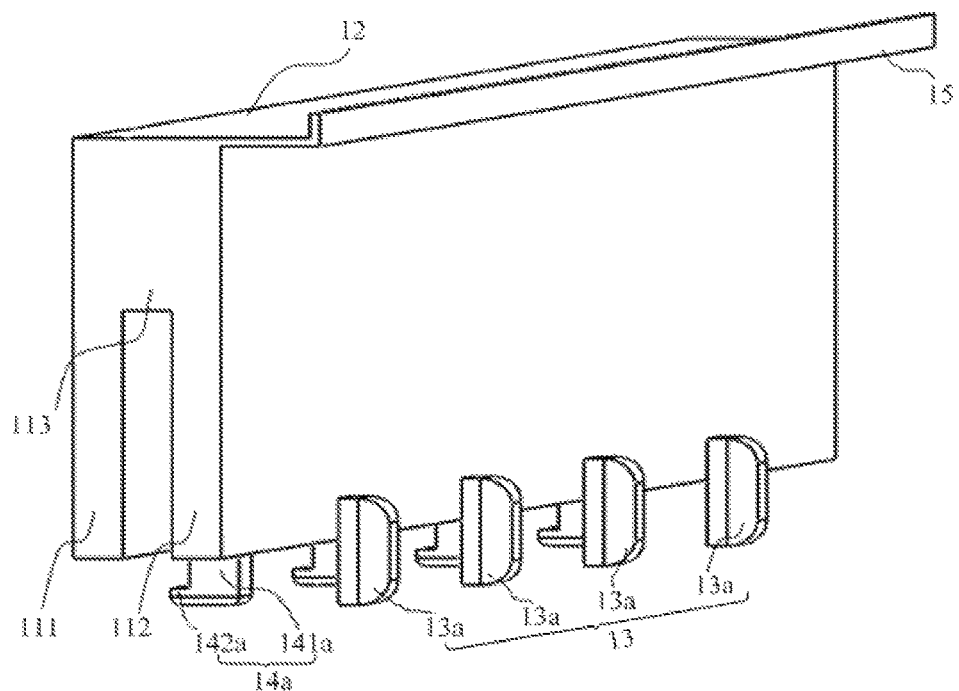
FIG. 4 is a structural schematic diagram of a glue frame according to another embodiment of the present disclosure.
Figure 5:
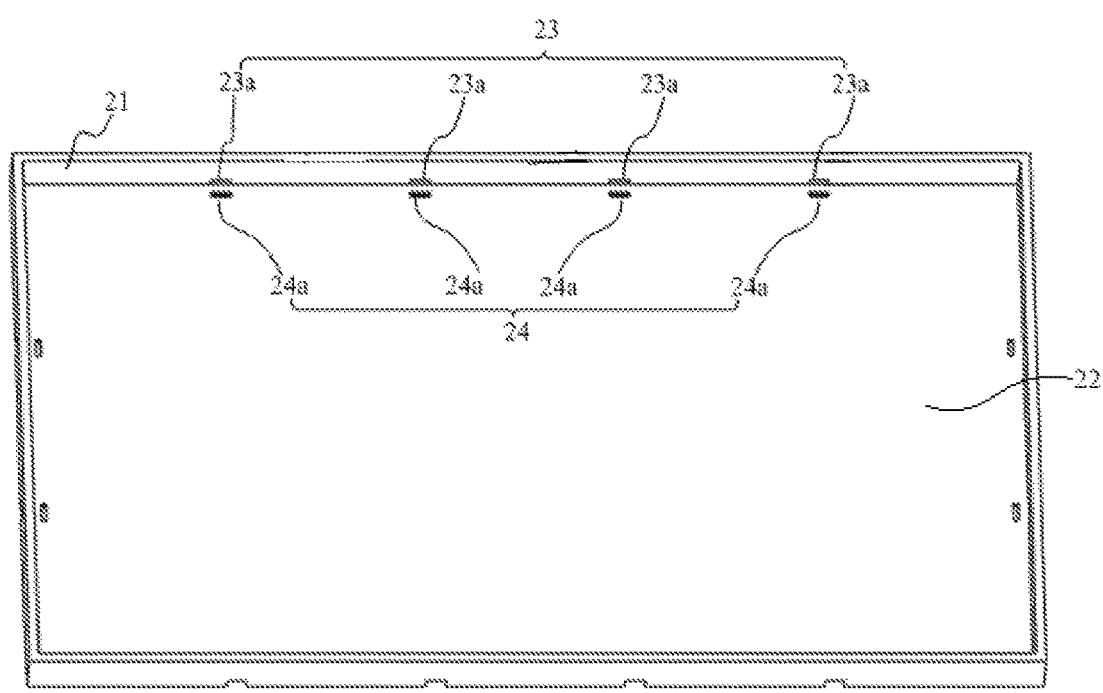
FIG. 5 is a structural schematic diagram of a backboard according to embodiments of the present disclosure.

As a specific implementation of the present disclosure, as shown in FIGS. 3 and 4, the fixing structure comprises a first fixing portion 13 and a second fixing portion 14 arranged at a predetermined distance from the first fixing portion 13. As shown in FIG. 5, the backboard 20 is provided with a first engagement hole 23 corresponding to the first fixing portion 13 and a second engagement hole 24 corresponding to the second fixing portion 14. The first fixing portion 13 is engaged in the first engagement hole 23 and an end of the first fixing portion 13 penetrates the first engagement hole 23 and protrudes from the lower surface of the backboard bottom wall. The second fixing portion 14 is engaged in the second engagement hole 24 and an end of the second fixing portion 14 penetrates the second engagement hole 24 and protrudes from the lower surface of the backboard bottom wall. The part of the first fixing portion 13 which protrudes from the lower surface of the backboard bottom wall and the part of the second fixing portion 14 which protrudes from the lower surface of the backboard bottom wall form said defining structure to define the printed circuit board 30 between the part of the first fixing portion 13 which protrudes from the lower surface of the backboard bottom wall and the part of the second fixing portion 14 which protrudes from the lower surface of the backboard bottom wall. The first fixing portion 13 penetrates the first engagement hole 23 and the second fixing portion 14 penetrates the second engagement hole 24 to connect the glue frame 10 to the backboard 20 in a fixed manner, while the parts of the first fixing portion 13 and the second fixing portion 14 which protrude from the backboard bottom wall 22 can clamp the printed circuit board. That is, the first fixing portion 13 and the second fixing portion 14 can further define the position of the printed circuit board 30 while connecting the glue frame 10 to the backboard 20 in a fixed manner.

Specifically, the predetermined distance is the width of the printed circuit board 30. When the width of the printed circuit board 30 is relatively small, it is possible to arrange the first fixing portion 13 and the second fixing portion 14 simultaneously at the bottom surface (i.e. the surface facing the backboard bottom wall) of the glue frame sidewall 11, and enable the width of the gap between the part of the first fixing portion 13 which protrudes from the lower surface of the backboard bottom wall and the part of the second fixing portion 14 which protrudes from the lower surface of the backboard bottom wall to be consistent with the width of the printed circuit board. When the width of the printed circuit board is relatively large, it is possible to arrange the first fixing portion 13 at the external surface of the glue frame sidewall and arrange the second fixing portion 14 at the bottom surface or internal surface of the glue frame sidewall, and enable the width of the gap between the part of the first fixing portion 13 which protrudes from the lower surface of the backboard bottom wall and the part of the second fixing portion 14 which protrudes from the lower surface of the backboard bottom wall to be consistent with the width of the printed circuit board.

Specifically, as shown in FIGS. 3-5, the first fixing portion 13 may comprise a plurality of first fixing pieces 13a, and the first engagement hole 23 comprises a plurality of first through holes 23a in one-to-one correspondence with the first fixing pieces 13a. The first fixing pieces 13a are engaged in the corresponding first through holes 23a, and the bottom ends of the first fixing pieces 13a protrude from the lower surface of the backboard bottom wall 22. The second fixing portion 14 comprises a plurality of second fixing pieces 14a, and the second engagement hole 24 comprises a plurality of second through holes 24a in one-to-one correspondence with the second fixing pieces 14a. The second fixing pieces 14a are engaged in the corresponding second through holes 24a, and the bottom ends of the second fixing pieces 14a protrude from the lower surface of the backboard bottom wall 22. The printed circuit board is engaged between the parts of the plurality of first fixing pieces 13a which protrude from the lower surface of the backboard bottom wall 22 and the parts of the plurality of second fixing pieces 14a which protrude from the lower surface of the backboard bottom wall 22.

Certainly, the structures of the first fixing portion 13 and the second fixing portion 14 are not so limited. For example, the first fixing portion 13 may also be a plate-like structure formed by interconnecting a plurality of first fixing pieces, as long as the first fixing portion 13 and the second fixing portion 14 can connect the glue frame 10 to the backboard 20 in a fixed manner, while the ends of the first fixing portion 13 and the second fixing portion 14 protrude from the lower surface of the backboard bottom wall 22 and can clamp the printed circuit board.

In an illustrative embodiment, as shown in FIGS. 3 and 4, the first fixing piece 13a is a buckle protruding from the glue frame sidewall, the first through hole is arranged at the border between the backboard sidewall 21 and the backboard bottom wall 22, and the buckle is engaged with the first through hole. Such arrangement manner enables the glue frame sidewall 11 to be attached to the backboard sidewall, and the fixing effect of the first fixing piece 13a can prevent the glue frame 10 from moving upwards relative to the backboard 20, thereby improving the stability of fixation of the glue frame 10 to the backboard 20.

Further, as shown in FIG. 4, the second fixing piece 14a comprises an erect portion 141a and a bent portion 142a. The erect portion 141a is connected between the glue frame sidewall 11 and the bent portion 142a, the erect portion 141a is located within the second through hole 24a, and the upper surface of the bent portion 142a is attached to the lower surface of the backboard bottom wall 22. The glue frame 10 is made of elastic material. When the glue frame 10 is assembled with the backboard 20, the second fixing piece 14a can be pressed towards the first fixing piece 13a such that the first fixing piece 13a penetrates the first through hole 23a, while the second fixing piece 14a penetrates the second through hole 24a. When the bent portion 142a of the second fixing piece 14a protrudes from the lower surface of the backboard bottom wall 22, the elastic recovery of the second fixing piece 14a enables the upper surface of the bent portion 142a to be attached to the lower surface of the backboard bottom wall 22, thereby further improving the stability of connection between the glue frame 10 and the backboard 20.

Still further, as shown in FIGS. 3 and 4, the glue frame sidewall 11 comprises an inner sidewall 111, an outer sidewall 112 and a connecting wall 113 connected between the inner sidewall 111 and the outer sidewall 112. The first fixing piece 13a is arranged on the outer sidewall 111 and the second fixing piece 14a is arranged on the inner sidewall 112 such that there is a gap between the inner sidewall 111 and the outer sidewall 112, which is advantageous to deformation of the glue frame sidewall 11 when the glue frame 10 is assembled with the backboard 20, such that the first fixing piece 13a and the second fixing piece 14a are engaged in the first through hole 23a and the second through hole 24a, respectively.

Further, as shown in FIGS. 1, 3 and 4, the glue frame 10 may further comprise a support platform 12 connected to the glue frame sidewall 11 which rests on the top end of the backboard sidewall 21 to support a display panel so as to prevent scuffing resulting from direct contact between the display panel and the backboard 20.

Further, as shown in FIGS. 3 and 4, a side of the support platform 12 away from the center of the frame-type structure is provided with a retaining wall 15. The region enclosed by the retaining wall 15 is used for defining the position of the display panel, thereby reducing the impact force on the display panel during the transportation of the display device.

Another aspect of the present disclosure provides a display device comprising a display panel and the above frame component provided by the present disclosure. The display panel is supported on the glue frame.

Figure 2:
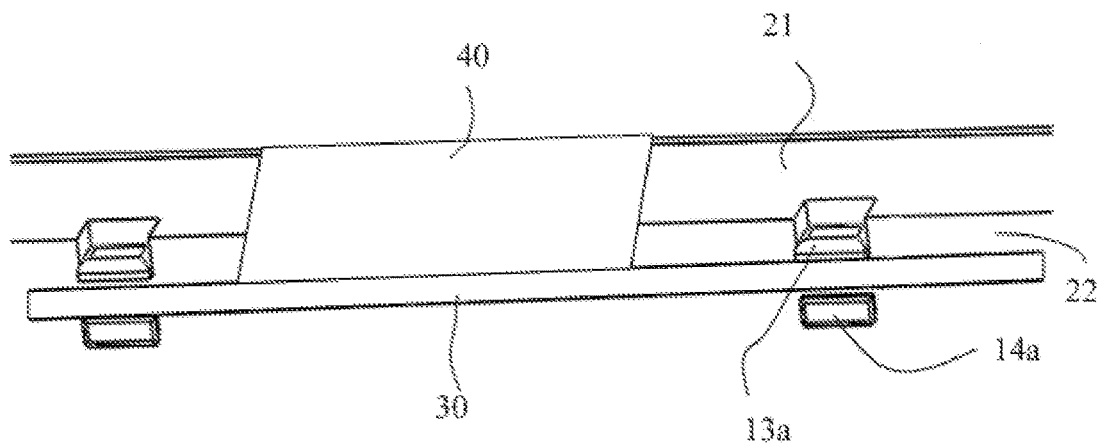
FIG. 2 is a structural schematic diagram of defining a printed circuit board according to embodiments of the present disclosure.

Specifically, as stated above, the glue frame comprises a support platform on which the display panel is arranged. The display panel is provided with a drive circuit. A side of a flexible printed circuit board (FPCB) 40 is connected to the drive circuit on the display panel, and the other side thereof is bent to the lower surface of the backboard bottom wall and connected to the printed circuit board (PCB) 30 (as shown in FIG. 2). Since there is no need to individually arrange in the frame component of the present disclosure a structure for positioning the printed circuit board, the frame component has a simple structure and consequently makes the structure of the display device simpler.

It can be understood that the above embodiments are exemplary embodiments used only for illustrating the principle of the present disclosure, and that the present disclosure is not so limited. Various variations and improvements may be made by those ordinarily skilled in the art without departing from the spirit and essence of the present disclosure. These variations and improvements are regarded as falling within the scope of the present disclosure.

The invention claimed is:

1. A frame component comprising: a glue frame comprising a glue frame sidewall which encloses as a frame-type structure; and a backboard comprising first and second engagement holes, a backboard sidewall and a backboard bottom wall, the backboard sidewall surrounding an external side of the glue frame sidewall; wherein the glue frame sidewall is provided with a fixing structure with first and second fixing portions located at an outer and an inner sidewalls respectively for connecting the glue frame to first and second engagement holes of the backboard respectively in a fixed manner, a connecting wall connects the outer and inner sidewalls in parallel, and the fixing structure forms a defining structure at a lower surface of the backboard bottom wall, the defining structure configured to define a position of a printed circuit board.

2. The frame component according to claim 1, wherein an end of the first fixing portion penetrates the first engagement hole and protrudes from the lower surface of the backboard bottom wall;

and wherein an end of the second fixing portion penetrates the second engagement hole and protrudes from the lower surface of the backboard bottom wall.

3. The frame component according to claim 2, wherein a part of the first fixing portion which protrudes from the lower surface of the backboard bottom wall and a part of the second fixing portion which protrudes from the lower surface of the backboard bottom wall form the defining structure.

4. The frame component according to claim 1, wherein the first fixing portion comprises a plurality of first fixing pieces, the first engagement hole comprises a plurality of first through holes in one-to-one correspondence with the first fixing pieces, the first fixing pieces are engaged in corresponding first through holes, and bottom ends of the first fixing pieces protrude from the lower surface of the backboard bottom wall.

5. The frame component according to claim 4, wherein the first fixing piece is a buckle protruding from the glue frame sidewall;
wherein the first through hole is arranged at the border between the backboard sidewall and the backboard bottom wall; and
wherein the buckle is engaged with the first through hole.

6. The frame component according to claim 1, wherein the second fixing piece comprises an erect portion and a bent portion;
wherein the erect portion is connected between the glue frame sidewall and the bent portion;
wherein the erect portion is located within the second through hole; and
wherein an upper surface of the bent portion is attached to the lower surface of the backboard bottom wall.

7. The frame component according to claim 1, wherein the glue frame further comprises a support platform connected to the glue frame sidewall;
wherein the support platform rests on a top end of the backboard sidewall.

8. The frame component according to claim 7, wherein a side of the support platform away from the center of the frame-type structure is provided with a retaining wall.

9. The frame component according to claim 1, wherein the first fixing portion is arranged at a predetermined distance from the second fixing portion.

10. The frame component according to claim 2,
wherein the first fixing portion comprises a plurality of first fixing pieces;
wherein the first engagement hole comprises a plurality of first through holes in one-to-one correspondence with the first fixing pieces, the first fixing pieces are engaged in corresponding first through holes; and
wherein bottom ends of the first fixing pieces protrude from the lower surface of the backboard bottom wall.

11. The frame component according to claim 3,
wherein the first fixing portion comprises a plurality of first fixing pieces;
wherein the first engagement hole comprises a plurality of first through holes in one-to-one correspondence with the first fixing pieces;
wherein the first fixing pieces are engaged in corresponding first through holes; and
wherein bottom ends of the first fixing pieces protrude from the lower surface of the backboard bottom wall.

12. A display device comprising: a display panel supported on a glue frame; a frame component comprising the glue frame and a backboard with first and second engagement holes; wherein the glue frame comprises a glue frame sidewall which encloses as a frame-type structure; wherein the backboard comprises a backboard sidewall and a backboard bottom wall; wherein the backboard sidewall surrounds an external side of the glue frame sidewall; wherein the glue frame sidewall is provided with a fixing structure with first and second fixing portions located at an outer and an inner sidewalls respectively for connecting the glue frame to first and second engagement holes of the backboard respectively in a fixed manner; a connecting wall connects the outer and inner sidewalls in parallel, wherein the fixing structure forms a defining structure at a lower surface of the backboard bottom wall, the defining structure configured to define a position of a printed circuit board.

13. The display device according to claim 12, wherein an end of the first fixing portion penetrates the first engagement hole and protrudes from the lower surface of the backboard bottom wall; and wherein an end of the second fixing portion penetrates the second engagement hole and protrudes from the lower surface of the backboard bottom wall.

* * * * *